(12) United States Patent
Rudin et al.

(10) Patent No.: US 7,587,082 B1
(45) Date of Patent: Sep. 8, 2009

(54) OBJECT RECOGNITION BASED ON 2D IMAGES AND 3D MODELS

(75) Inventors: Leonid I. Rudin, San Marino, CA (US); Jose-Luis Lisani, Pasadena, CA (US); Pascal Monasse, Los Angeles, CA (US); Jean-Michel Morel, Paris (FR)

(73) Assignee: Cognitech, Inc., Pasadena, CA (US)

( * ) Notice: Subject to any disclaimer, the term of this patent is extended or adjusted under 35 U.S.C. 154(b) by 745 days.

(21) Appl. No.: 11/356,816

(22) Filed: Feb. 17, 2006

(51) Int. Cl.
*G06K 9/00* (2006.01)

(52) U.S. Cl. ........................ 382/154; 345/419

(58) Field of Classification Search ............. 382/154
See application file for complete search history.

(56) References Cited

U.S. PATENT DOCUMENTS

| | | | |
|---|---|---|---|
| 5,973,697 A | 10/1999 | Berry et al. | |
| 6,016,148 A | 1/2000 | Kang et al. | |
| 6,028,672 A | 2/2000 | Geng | |
| 6,031,539 A | 2/2000 | Kang et al. | |
| 6,052,132 A | 4/2000 | Christian et al. | |
| 6,064,426 A | 5/2000 | Waterman | |
| 6,072,894 A | 6/2000 | Payne | |
| 6,084,556 A | 7/2000 | Zwern | |
| 6,142,876 A | 11/2000 | Cumbers | |
| 6,760,035 B2 | 7/2004 | Tjandrasuwita | |
| 6,765,584 B1 | 7/2004 | Wloka et al. | |
| 6,906,716 B2 | 6/2005 | Moreton et al. | |
| 2001/0000025 A1 | 3/2001 | Darrell et al. | |
| 2003/0231788 A1 | 12/2003 | Yukhin et al. | |
| 2003/0235335 A1 | 12/2003 | Yukhin et al. | |

OTHER PUBLICATIONS

Desolneux, A., et al., "Maximal Meaningful Events And Applications To Image Analysis[1]", The Annals of Statistics, vol. 31, No. 6, 2003, p. 1822-1851.
Lisani, A., et al., "On The Theory Of Planar Shape", Multiscale Model. Simul., vol. 1, No. 1, 2003, p. 1-24.

*Primary Examiner*—Matthew C Bella
*Assistant Examiner*—Thomas A Conway
(74) *Attorney, Agent, or Firm*—Klein, O'Neill & Singh, LLP

(57) ABSTRACT

Methods and systems for performing object directed recognition based on two-dimensional images and three-dimensional models. Transforms are used to map features of an object to an image seen from a vantage point and to map features of images best seen from the vantage points to three-dimensional models. Mapping of features and images to the three-dimensional model and then to image planes of other images in comparison of corresponding features from the mapped images to original images allows for determination of coherence between the mapped images and the original images.

7 Claims, 9 Drawing Sheets

OBJECT RECOGNITION BASED ON 2D IMAGES AND 3D MODELS

BACKGROUND OF THE INVENTION

The invention relates generally to object recognition, and more particularly to determining whether a two dimensional image includes a representation of a three dimensional object.

Imaging devices have been known for many years, and are widely prevalent. A wide number of types of imaging devices are available, including those which focus light onto material coated with photosensitive films, those with light sensitive electronic elements, those which respond to variations in magnetic fields, and others. From instant cameras to satellite systems to cell phone cameras, imaging devices are ubiquitous. Generally these image devices record a two-dimensional image of a three-dimensional object from a viewpoint.

Often it is desirable to know if an object in an image corresponds to a particular known object. Attempts to accomplish this may be performed by individuals skilled in image analysis, although this may be a time consuming endeavor and any results may be subject to controversy relating to the analytic approach, the interpretation of features in the image, and other matters. Further, such an approach may be unworkable if a large number of images are under analysis or if the results of image analysis are needed quickly.

BRIEF SUMMARY OF THE INVENTION

The invention provides object recognition systems and methods. One aspect of the invention provides a method of determining if a plurality of images include the same three dimensional object, comprising receiving a model of a three dimensional object; receiving a plurality of images, each of the images representing a view from a viewpoint; determining, for each viewpoint, a transform providing a mapping between the viewpoint and the model of the three dimensional object; mapping a first of the plurality of images to a viewpoint of a second of the plurality of images; and comparing the mapped first of the plurality of images to the second of the plurality of images.

Another aspect of the invention provides a method of determining which images in a group of images are images of a particular object, comprising receiving a model of a three dimensional object; receiving a plurality of images; matching features in each image to features of the model; determining a transform between each image and the model using the matched features; for each image, mapping the image to the model and mapping the mapped image to viewpoints of each of the other images based on the transforms for each of the other images; comparing features of the mapped mapped image to the corresponding other image; and determining which of the images include the same object.

Another aspect of the invention provides a method of determining if a plurality of images of an object correspond to a particular model in a set of models of objects, comprising mapping information of a two dimensional image to a plurality of three dimensional models; mapping the mapped information to a vantage point of at least one other two dimensional image; and determining if the mapped mapped information is coherent with information of the other image for each of the plurality of three dimensional models.

These and other aspects of the invention are more fully comprehended in view of this disclosure, including the accompanying figures.

DETAILED DESCRIPTION

Determining whether a particular object in an image or a group of images is an image of a known object is often desirable. In some embodiments and aspects of the invention a three dimensional model is determined for an object of interest. A number of images are received, with, generally, each of the images believed to include the object. The images, generally, each may portray the object from a possibly different viewpoint. A projective transform from the three dimensional model to each of the viewpoints is determined. For each image an inverse projective transform is performed, mapping the supposed object in the image to the three dimensional model. The mapped image is projectively transformed to viewpoints of other images. The mapped transformed image is compared with the other images. In some embodiments the comparison determines if the mapped transformed image and the other images are meaningfully similar. In some embodiments the comparison is performed by detecting meaningful groups of matching lines. In some embodiments the comparison is performed by detecting meaningful differences in color or illumination. In some embodiments the comparison is performed by detecting differences, preferably meaningful differences, in positions of corresponding points.

FIGS. 1a-j illustrate an object from various viewpoints. The use of an object such as depicted in FIGS. 1a-j is primarily for descriptive purposes. In many embodiments the object of interest is, for example, a head of a person, or a portion of a head, such as a face. In FIGS. 1a-j each of the views of the object are from different vantage points. The object comprises a cube 111 with a quadrilateral prism 113 extending from a surface of the cube. The length of the quadrilateral prism extends away from the cube and is much greater than the width or height of the quadrilateral prism. Additionally, a hexagonal aperture 115 extends through the prism about a portion of the prism distal from the cube.

Figure 1A:
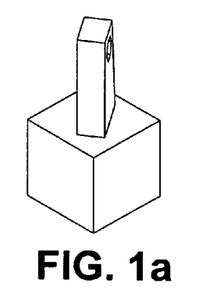
FIGS. 1a-j illustrate a number of perspective views of an object.
Figure 1B:
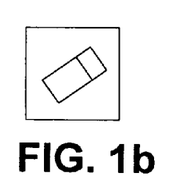
Figure 1C:
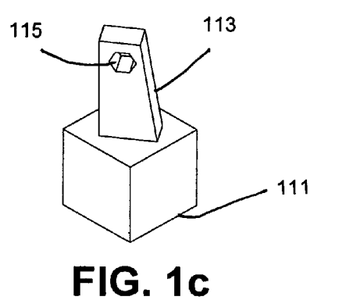
Figure 1D:
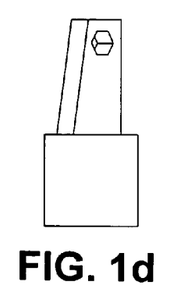
Figure 1E:
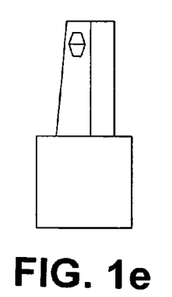
Figure 1F:
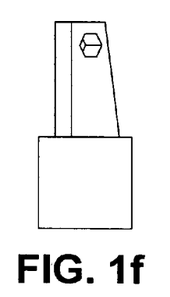
Figure 1G:
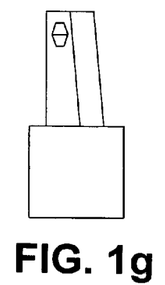
Figure 1H:
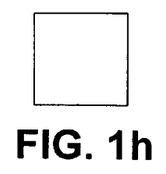
Figure 1I:
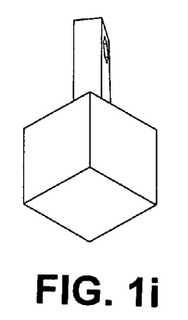
Figure 1J:
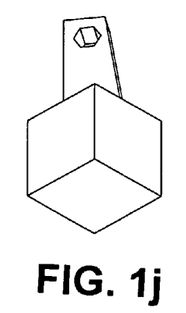
Figure 2:
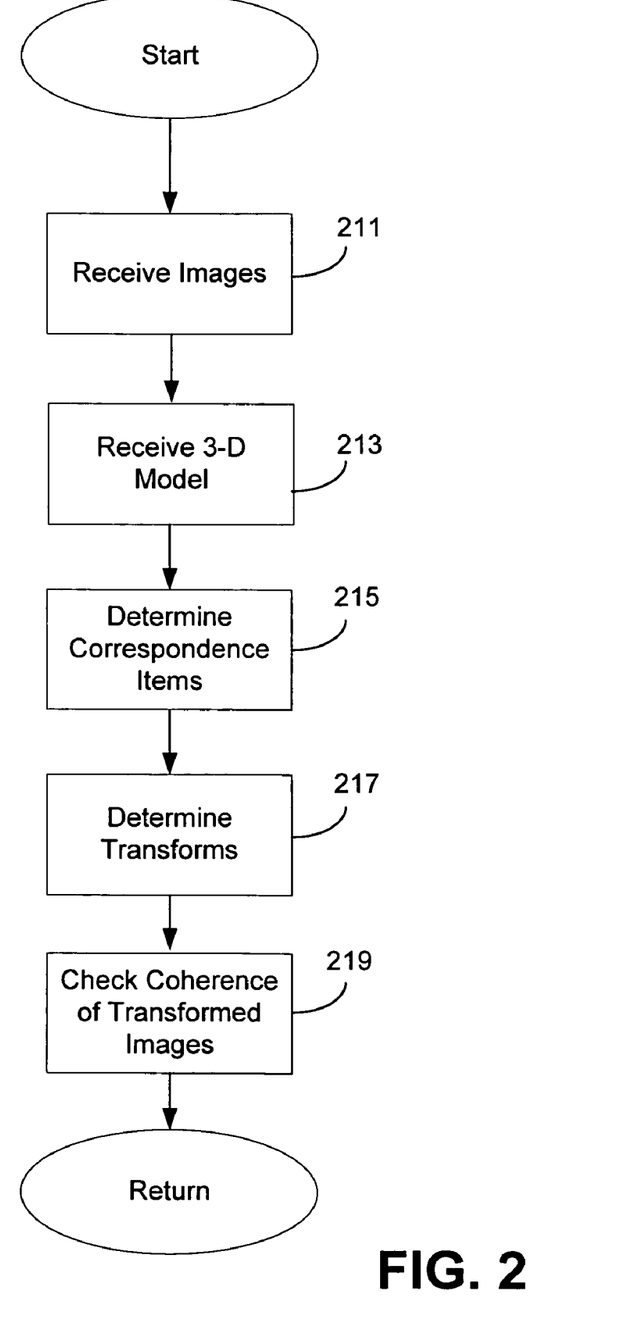
FIG. 2 is a flow diagram of a process for determining coherence of images using a three dimensional model in accordance with aspects of the invention.

FIG. 2 is a flow diagram of a process for determining if images include the object. The process, in various embodiments, is performed by a computer, such as a computer comprising a processor and associated memory. In some embodiments the computer is a personal computer (PC), a SPARC station, a mini-computer, a mainframe computer, or other types of computing devices. Generally information is stored in memory of the computing device and one or more processors is configured, generally by program instructions, to perform calculations using the information and to request storage of results of calculations in the memory.

Image information is received in block 211 of the process. Preferably the image information is received in digital format, with the image information representing a plurality of images. In block 213 a three dimensional model of an object is received. Preferably the three dimensional model describes the object as a mathematical construct in three dimensional space.

Features of the images and the model are selected as correspondence items in block 215. For example, for the object of FIGS. 1a-j, sides of the outline of the quadrilateral prism, sides of the hexagonal aperture, and other features may be selected as correspondence items. Similarly, if an object is a face, for example, edges of the eyes, the tip of the nose, and other features could be selected as correspondence items.

In Block 217 a transform is derived for each image, such that the transform maps the three dimensional model to a two dimensional image from a perspective at a vantage point associated with the image. The transform is determined, for example, based on the correspondence items. Preferably a projective transform is derived, although in various embodiments other transforms, or sequences of transforms, may be used. An inverse of the transform, or inverse transform, maps an image from the viewpoint to the three dimensional model. In some embodiments the inverse transform is separately calculated, while in some embodiments inverse operations using the transform are performed.

Figure 8:
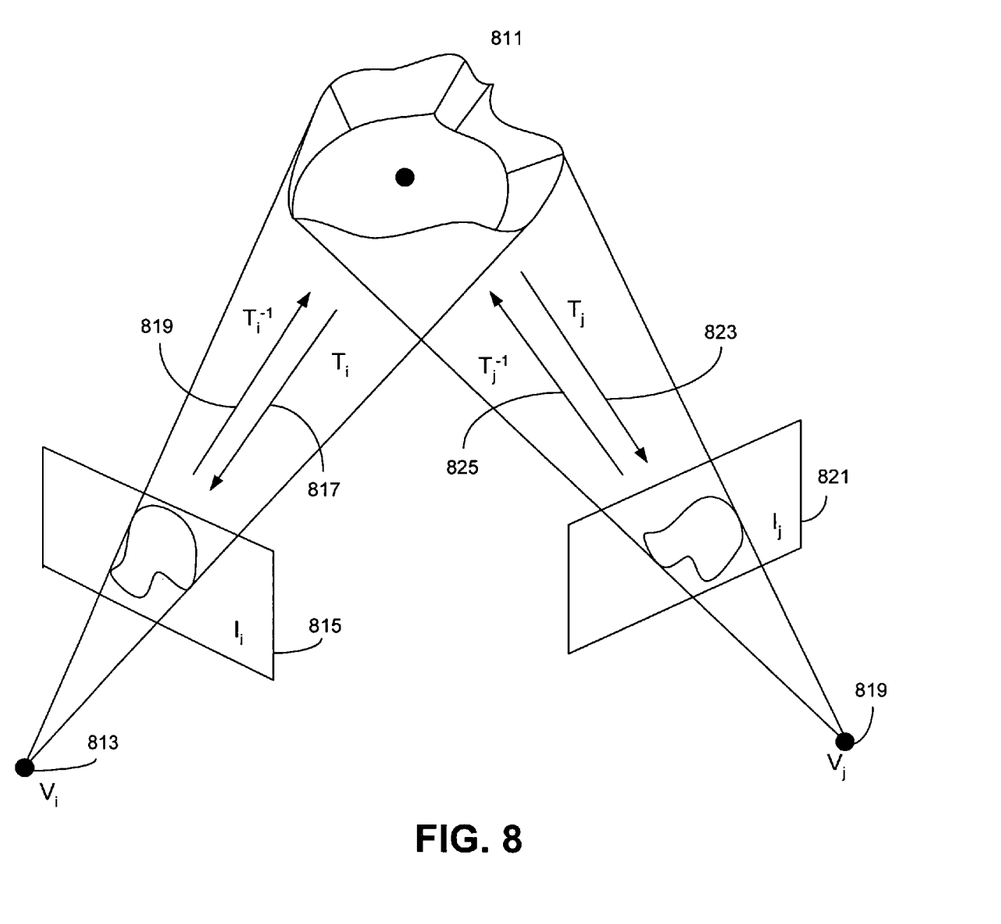
FIG. 8 illustrates an object and views of an object in various image planes.

Consider FIG. 8. FIG. 8 depicts a three-dimensional object 811 centered about an origin O. An Image plane 813 includes a depiction of the object in an image $I_i$ as seen from a vantage point $V_i$ 815. It should be recognized that image $I_i$ may be only a specific object out of many objects depicted in the image plane, or even only a portion of an object depicted in the image plane. A transform $T_i$ maps features of the object to the image plane 815, and an inverse projection $T_i^{-1}$ maps features from the image plane to the three-dimensional object. Similarly, an image plane 821 depicts an image $I_j$ of the object as seen from a vantage point $V_j$. Projection $T_j$ maps features of the object to the image plane, and an inverse projection $T_j^{-1}$ maps features from the image plane to the object.

Returning to FIG. 2, the coherence of transformed images is checked in block 219. Coherence of the transformed images indicates that the images are images of the object. Coherence of the transformed images may be performed by mapping features, in some embodiments the correspondence items, of each image to the 3D model of the object, projecting the mapped features to vantage points of different images, and determining if the mapped and projected features match features of the different images. Coherence of transformed images is, in some embodiments, performed by mapping information from a plurality of images to a vantage point, and determining, preferably using statistical analysis, whether the mapped information matches. In some embodiments determining matches between mapped and projected features and image features comprises determining if the features (which may be points) match, or match within some delta distance, in pixels in some embodiments. In various embodiments determining matches between mapped and projected features and image features is based on, variously, whether the mapped and projected features are meaningfully similar to the image features, or whether there is a meaningful difference between the mapped and projected features and the image features.

Figure 3:
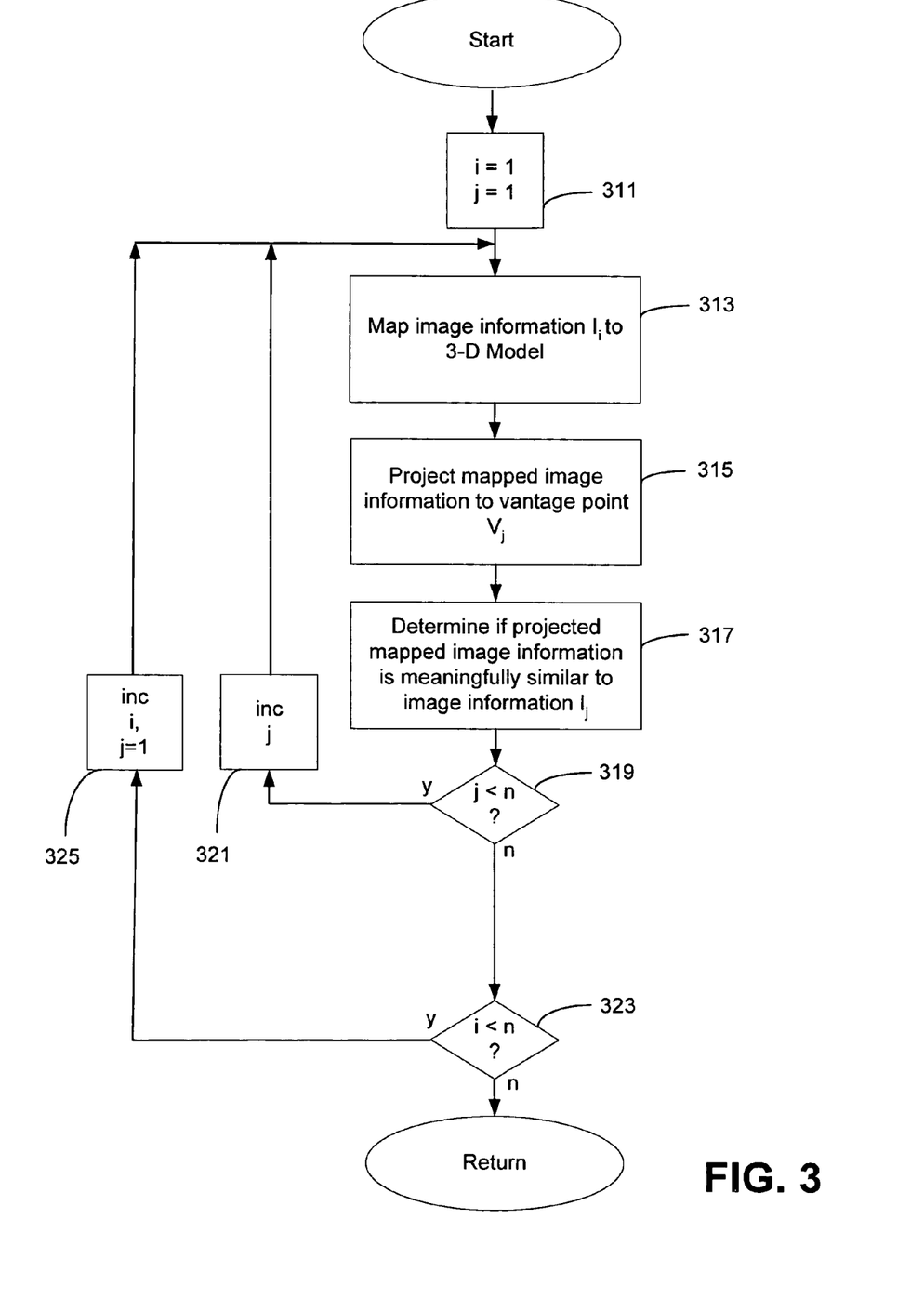
FIG. 3 is a flow diagram of a process for determining if images correspond to an object in accordance with aspects of the invention.

FIG. 3 is a flow chart of a process for checking coherence of transformed images. In some embodiments there are $I_1 \ldots I_n$ images. In block 311 counters, i and j for purposes of exposition, are initialized. For convenience of description counters are used to describe iterative and/or looping aspects of the process. It should be recognized, however, that in the context of the invention other constructs for performing such aspects are used in various embodiments.

In block 313 information of a selected feature, or features, in image $I_i$ is mapped to the three dimensional model using the inverse transform associated with the vantage point of image $I_j$. The information may be pixel values, for example, or information derived from pixel values. In some embodiments pixel information is mapped, and comparisons are performed such as discussed with respect to block 317, using information derived from pixel values. The selected feature(s) may be the corresponding features used in determining transforms, feature(s) expected to be present in other images, or features selected on some other basis. In some embodiments the selected features comprise color features (groups of pixels with a common color or colors of groups of pixels, for example), grey level features, curves and/or lines or pieces thereof (see, e.g., J. L. Lisani: et al., "A Blind Definition of Shape", ESAIM:Control, Optimization and Calculus of Variations, June 2002, Vol. 8, p. 863-872, incorporated by reference herein) present in the image, or relationships (such as distance) between points. In many embodiments direction of gradient or other aspect generally invariant to contrast changes is the selected feature, or used for purposes of comparison (see, e.g., J. L. Lisani et al., "Detection of Major Changes in Satellite Images", IEEE International Conference on Image Processing (September 2003), incorporated by reference herein).

In block 315 the selected feature(s) mapped to the three dimensional model are projected to the vantage point associated with image $I_j$ using the transform associated with the vantage point of image $I_j$. In some embodiments blocks 313 and 315 are combined in a single operation.

In block 317 the common feature(s) as mapped by the inverse transform to the model and transformed to the $I_j$ vantage point are compared with the common feature(s) of the image $I_j$. In some embodiments the comparison determines whether the common feature(s) match or match within some delta distance, in pixels for example. In some embodiments the comparison determines if there are meaningful similarities, or if there are meaningful differences, between the common feature(s). In some embodiments the images $I_j$ and $I_i$ are declared images of the same object if the common features is meaningfully similar, or not meaningfully different.

In block 319 the j counter is checked to determine if j is less than the number of images. If so, the process increments i in block 321 and returns to block 313. If j is equal to or greater than the number of images, the process in block 323 checks whether the i counter is less than the number of images. If so, the process increments i and sets j equal to 1 and returns to block 313.

In some embodiments somewhat the converse is also performed with respect to the images $I_i$ and $I_j$. Thus, the foregoing process largely mapped common feature(s) of the object of image $I_i$ to the three dimensional model, transformed the mapped common feature(s) to a projection as viewed from the viewpoint of image $I_j$, and compared the projection to the image $I_j$. In some embodiments, in addition the use of the images $I_i$ and $I_j$ and their associated viewpoints are reversed, with mapping of the common feature(s) of the object of image $I_j$ to the three dimensional model, transformation of the mapped common feature(s) to a projection as viewed from the viewpoint of the image $I_i$, and comparison of the projection with the image $I_i$.

Figure 4:
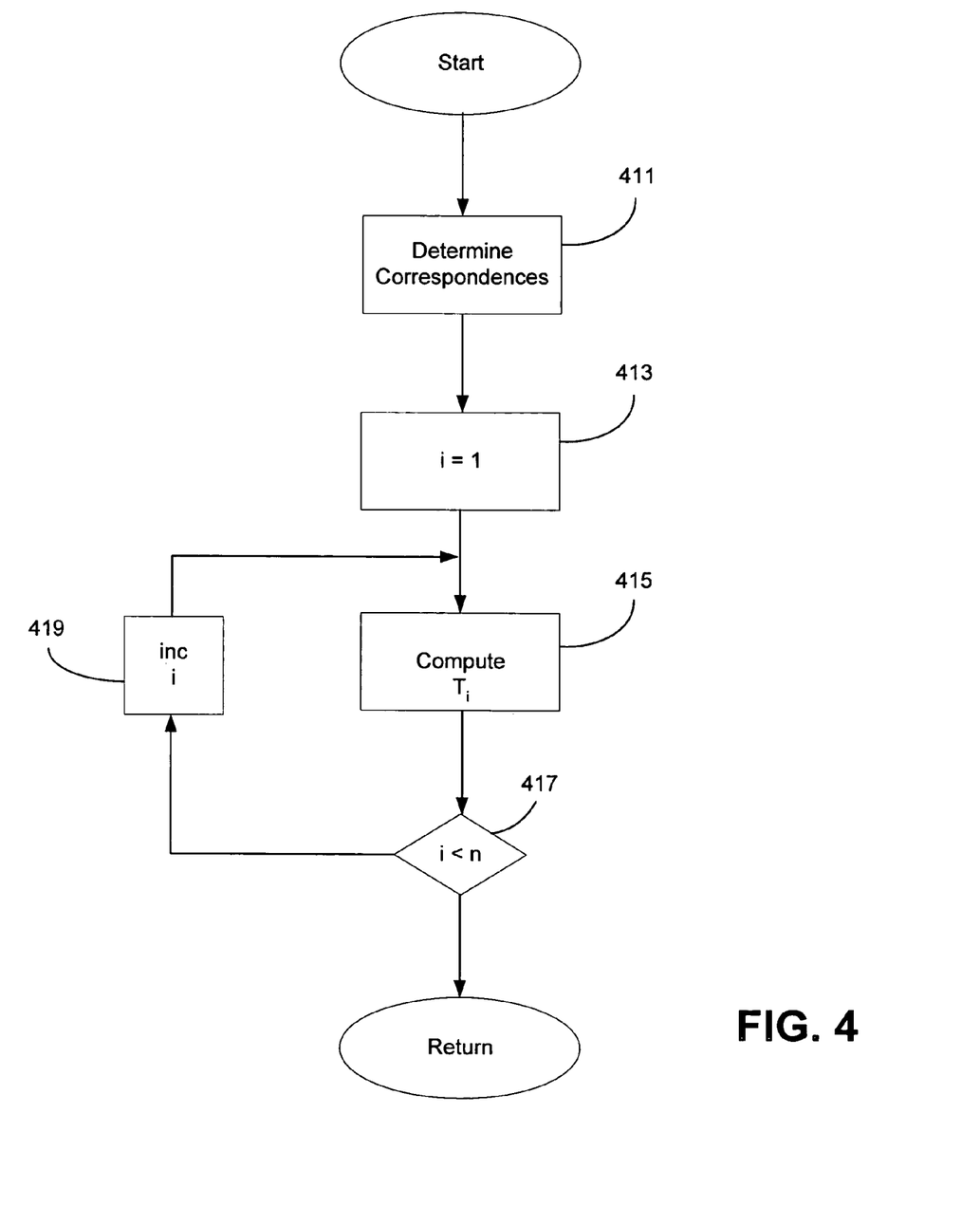
FIG. 4 is a flow diagram of a process for determining transforms in accordance with aspects of the invention.

FIG. 4 is a flow diagram for a process for deriving transforms that map a 3D model onto a view from a vantage point. The transform therefore maps the three dimensional model into two dimensional space. In block 411 correspondence features in an image and the 3D model are determined. The features are received by the process in some embodiments. The received features, for example, may identify sets of pixels, such as sets of adjacent pixels containing a similar attribute. In some embodiments the correspondence features are determined automatically, for example by determination of similar linelets, determination of similar colors or graylevels of adjacent pixels, or by other means.

In block 413 a counter i is initialized to 1. As previously discussed, the use of a counter is for convenience, and other looping and/or iterative methods are used in various embodiments. In block 415 a transform $T_i$ is computed. The transform maps the 3D model into two-dimensional space corresponding to a view from a vantage point associated with the image. Preferably the transformation is a projective transformation, although in various embodiments other transformations may be used. In block 417 the process determines if i is less than n, assuming n images are available. Is so, i is incremented in block 419 and the process returns to block 415 and computes a transform for another vantage point. If i is not less than n, namely all of the images have been processed, the process returns.

Figure 5:
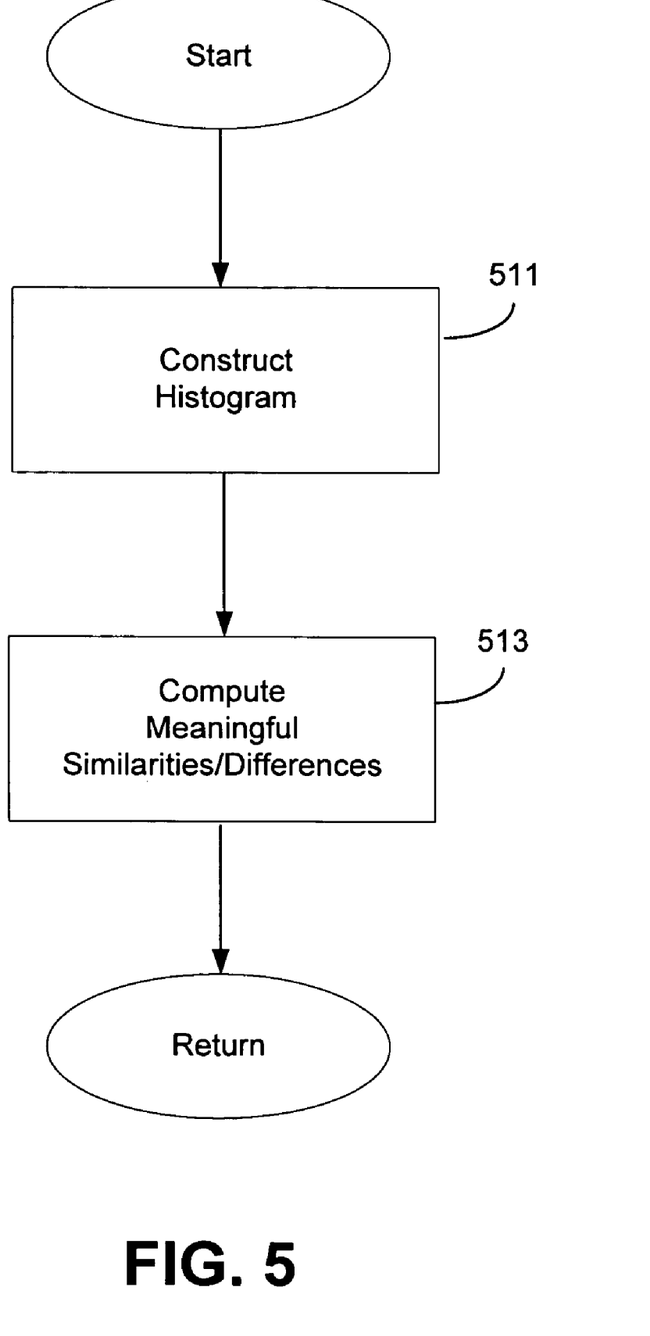
FIG. 5 is a flow diagram of a process for determining meaningful modes in accordance with aspects of the invention.

FIG. 5 illustrates a flow diagram of a process for determining meaningful differences. In block 511 a histogram is constructed. The histogram is of the set of scalar data values determined, for example, by absolute differences in the feature values, such as computed in the process of FIG. 3. The histogram is a function that assigns, to each value, its number of occurrences in the dataset. Thus, if the absolute differences in feature value has eight possible values, 0 . . . 7, and 1,000 features are processed, it may be found that the value zero may occur a times, the value 1 may occur b times, . . . , the value 7 may occur h times, with a+b+ . . . +h=1,000.

In block 511 the process determines the occurrence of a meaningful difference. In some aspects, an event, such as results of a measurement, are considered meaningful if the probabilistic expectation of its occurrence, for example randomly, is very small. A meaningful difference is indicated in the histogram by an interval of values starting at zero where data is concentrated. The interval is said to be meaningful if the expectation of such a concentration is very small. Additional information regarding meaningfulness and meaningful analysis of histograms may be found, for example, in Desolneux et al., Maximal Meaningful Events and Applications to Image Analysis, The Annals of Statistics, Vol. 31, No. 6, p. 1822-1851, December 2003, incorporated by reference herein. The process thereafter returns.

In some embodiments meaningful differences are determined by comparing pixels, or information from pixels such as direction of gradient, and considering the results of those comparisons. For example, differences in direction of gradient may be considered, particularly the number of compared pixels with differences above a threshold value. The threshold value may be set to a value such that comparisons of groups of pixels with uniformly random gradients would have a large percentage of differences above the threshold value.

Figure 6:
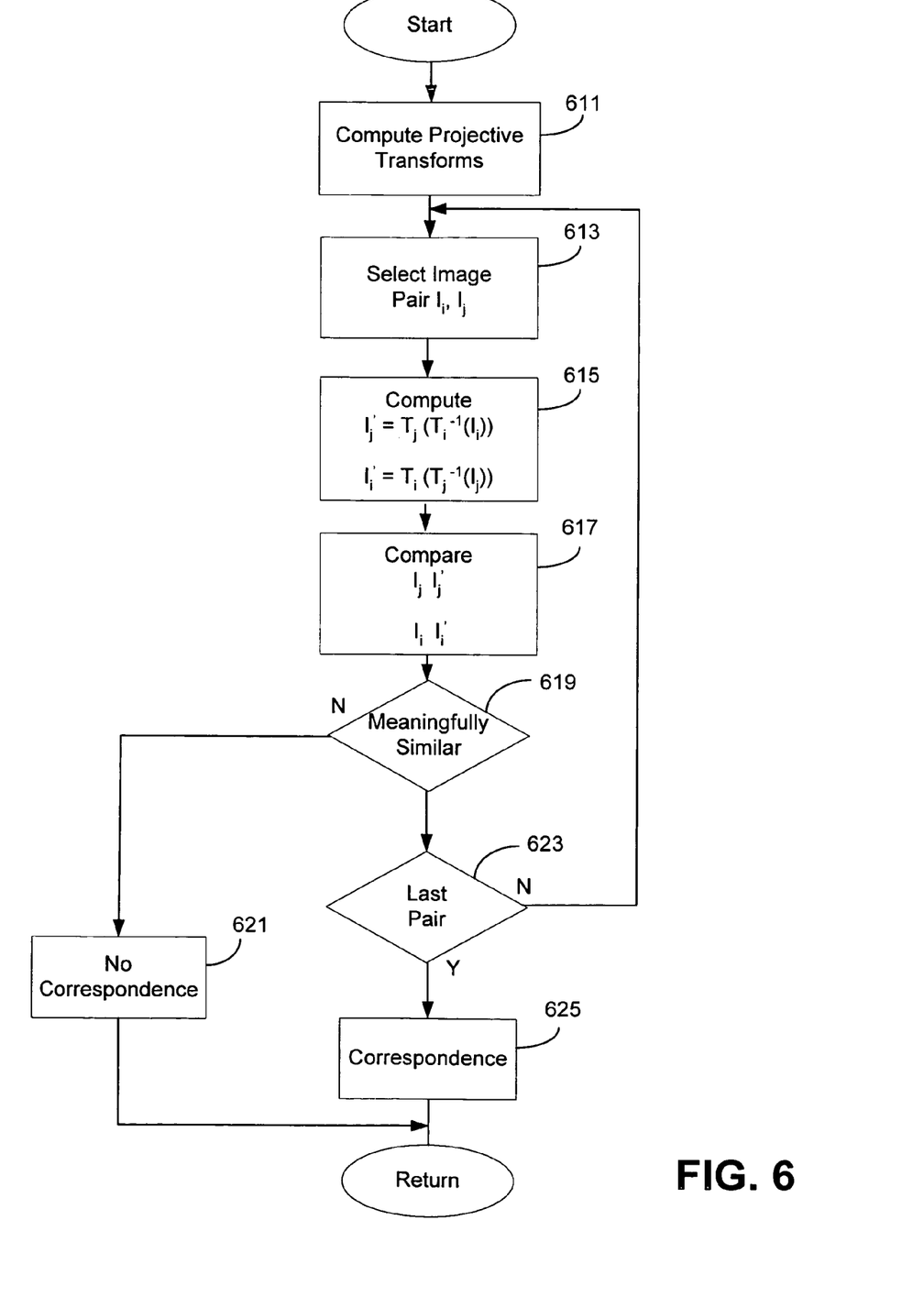
FIG. 6 is a further flow diagram of a process for determining coherence of images in accordance with aspects of the invention.

FIG. 6 is a flow diagram of a further embodiment of a method for determining if a plurality of images are of the same object. The object is represented by information defining a three-dimensional model. The images potentially include the object, with at least some of the images having views of the object from different vantage points.

In block 611 the process computes projective transforms which map aspects of the three-dimensional model to the vantage point of each image. In some embodiments features are selected on the three-dimensional model and corresponding features are selected in the images. The projective transform mapping the corresponding feature from the 3D wheel to a particular image is computed. The selected features may be, for example, curves on the object or other aspects of the object. Projective transforms are computed for each vantage point.

In block 613 a pair of images is selected. For convenience, a first image of the pair is denoted as $I_i$ and a second image of the pair is denoted $I_j$, with i associated with the vantage point I and j associated with vantage point J. In block 615 $I_j'=T_j(T_i^{-1}(I_i))$ is computed. Here $T_j$ is the projective transform mapping aspects from the three-dimensional model to the vantage point associated with the image $I_j$, $T_i$ is the transform mapping aspects of the 3D mode to the vantage point associated with the image $I_i$, and $T_i^{-1}$ is the inverse transform of $T_i$, which therefore maps the image information of $I_i$ to the three-dimensional model. Thus, the computation of $I_j'=T_j(T_i^{-1}(I_i))$ maps image information from the image $I_i$ to the three-dimensional model and then to the vantage point associated with the image $I_j$. Similarly, $I_i'=T_i(T_j^{-1}(I_j))$ is also computed.

In block 617 $I_j$ and $I_j'$ are compared. Also in block 617, $I_i$ and $I_i'$ are also compared. In many embodiments only portions of images are used for comparison purposes.

In block 619 the process determines if $I_j$ and $I_j'$ are meaningfully similar and if $I_i$ and $I_i'$ are also meaningfully similar (or alternatively meaningfully different). If the items are not meaningfully similar the process goes to block 621 and declares no correspondence between all of the images, and the process thereafter returns. If the items are meaningfully similar the process determines if all pairs of images have been examined. If so, the process in block 625 declares correspondence between all of the images and the object, and thereafter returns. If not all images have been examined, then the process returns to block 613.

Figure 7:
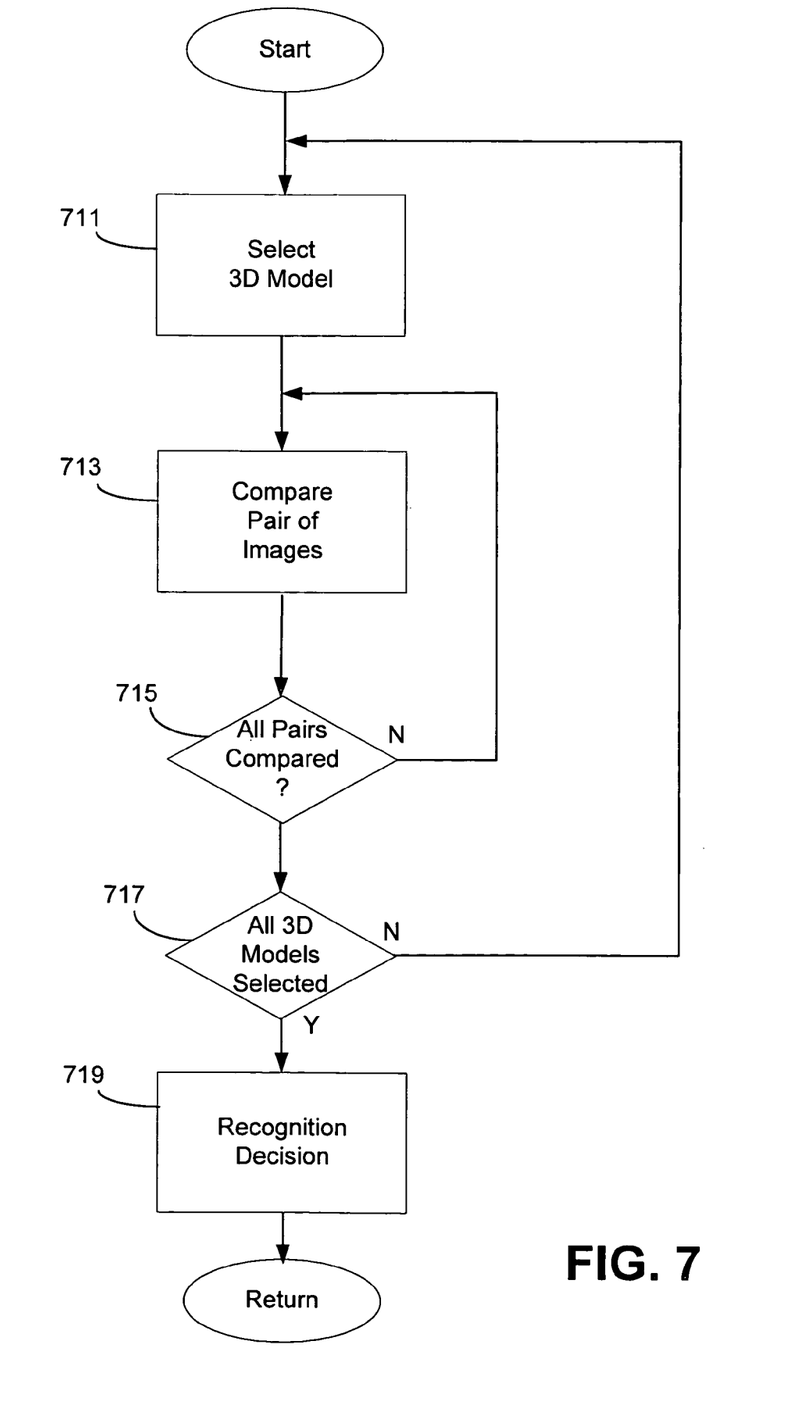
FIG. 7 is a flow diagram for determining if images of an object are of an object of a set of objects.

FIG. 7 is a flow diagram for a further process in accordance with aspects of the invention. The process of FIG. 7 determines if the plurality of images of the same object are coherent with a particular three-dimensional model of a plurality of three-dimensional models. In block 711 of the process a particular three-dimensional model is selected. The three-dimensional model preferably is a mathematical description of a three-dimensional object. In block 713 the process compares a pair of images using the selected three-dimensional model. Generally comparison of a pair of images is performed by determining corresponding features of the invention with features of the three-dimensional model, determining transforms for mapping features of the three-dimensional model to the corresponding features of the images, and mapping the images from their respective vantage points to the vantage point of the other images, and comparing the corresponding mapped images and the other images.

In block 715 the process determines if all pairs of images have been compared. If further pairs of images remain for comparison then the process returns to block 713. If all pairs of images have been compared the process continues to block 717. In block 717 the process determines if all 3D models have been selected. If all 3D models have not been selected the process returns to block 711 and selects a further three-dimensional model. If all three-dimensional models have been selected the process proceeds to block 719.

In block 719 the process makes a recognition decision, namely a determination as to whether a plurality of images correspond to a particular 3D model. In some embodiments, if the results of comparisons of pairs of images indicate that pairs of images for a particular three-dimensional model are meaningfully similar, or in some embodiments not meaningfully different, then the images correspond to the object of the three-dimensional model.

As an example, all of the 3D models may be three-dimensional models of heads or faces of a large number of individuals. Assuming a number of images of a person are available, the process of FIG. 7 determines if an individual depicted in the images is a person represented by a particular three-dimensional model out of a set of three-dimensional models. Similarly, in various embodiments the three-dimensional models may be other three-dimensional objects, such as vehicles, and the process of FIG. 7 determines if images of an object depict a vehicle having a three-dimensional model representation in a set of such representations.

In some embodiments image information is mapped to a three-dimensional model, and considered with respect to other image information mapped to the three-dimensional model. Thus, for example, in various embodiments information from two images are both mapped to a three-dimensional model and compared, instead of mapping information from an image to the three-dimensional model and then to a vantage point of another image before performing a comparison. As an additional example, in various embodiments information from a plurality of images, preferably a large number of images, is mapped to the three-dimensional model, and the information is analyzed to determine which, or determine if all, information is consistent or inconsistent.

Figure 9:
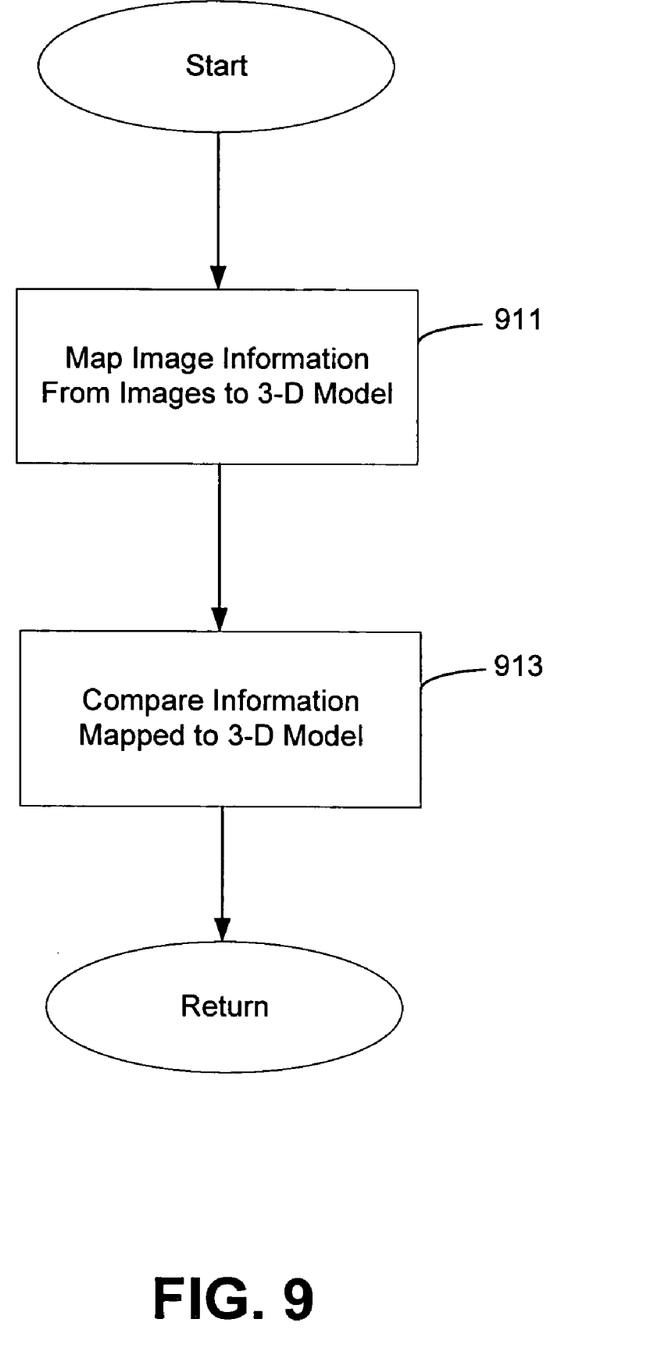
FIG. 9 is a flow diagram of a further process in accordance with aspects of the invention.

FIG. 9 is a flow diagram of a process for performing image comparisons using a three-dimensional model. In various alternative embodiments the process of FIG. 9 is used as part of block 219 of the process of FIG. 2, or in place or partially in place of block 313, 315, and 317 of the process of FIG. 3 or blocks 615 and 617 of the process of FIG. 6.

In block 911 of the process of FIG. 9, information from a first image and information from a second image are mapped, using a transform as previously discussed for example, to a three-dimensional model. In some embodiments information from many images is mapped to the three-dimensional model. The information may be curves or portions of curves, such as indicated by generally contiguous pixels of similar color, brightness, or other aspect, may be selected points, or may be other information.

In block 913 the process compares the information mapped to the three-dimensional model. In some embodiments the comparison is based on distance, such as geodesic distance, between corresponding (or expected corresponding) points from the two images, or between curves or portions of curves from the two images. The process thereafter returns.

The invention provides object recognition based on two dimensional images and three-dimensional models. Although the invention has been described in certain specific embodiments, it should be recognized that the invention comprises the claims and their insubstantial variations supported by this disclosure.

What is claimed is:

1. A method of determining if a plurality of images include the same three dimensional object, comprising: receiving a model of a three dimensional object;
   receiving a plurality of images, each of the images representing a view from a viewpoint;
   determining, for each viewpoint, a transform providing a mapping between the viewpoint and the model of the three dimensional object;
   mapping a first of the plurality of images to a viewpoint of a second of the plurality of images based on the transform providing a mapping between the viewpoint of the first image and the model and the transform providing a mapping between the viewpoint of the second image and the model; and comparing the mapped first of the plurality of images to the second of the plurality of images.

2. The method of claim 1 further comprising determining if the mapped first of the plurality of images and the second of plurality of images are meaningfully similar.

3. The method of claim 1 further comprising determining if the mapped first of the plurality of images and the second of plurality of images are meaningfully different.

4. The method of claim 1 further comprising mapping the second of the plurality of images to the viewpoint of the first of the plurality of images and comparing the mapped second of the plurality of images to the first of the plurality of images.

5. The method of claim 1 wherein the transform providing a mapping between the viewpoint and the model of the three dimensional object comprises a transform mapping the viewpoint to the model of the three dimensional object.

6. The method of claim 5 wherein mapping a first of the plurality of images to the viewpoint of the second of the plurality of images based on the transform providing a mapping between the viewpoint of the first image and the model and the transform providing a mapping between the viewpoint of the second image and the model comprises: mapping the first of the plurality of images to the model of the three dimensional object using the transform mapping the viewpoint of the first image to the model of the three dimensional object, thereby providing a mapped first of the plurality of images; and mapping the mapped first of the plurality of images to the viewpoint of the second of the plurality of images using an inverse of the transform mapping the viewpoint of the second image to the model of the three dimensional object.

7. The method of claim 1 wherein the images include an image of a face of at least one individual.

* * * * *

UNITED STATES PATENT AND TRADEMARK OFFICE
CERTIFICATE OF CORRECTION

PATENT NO.        : 7,587,082 B1                                      Page 1 of 1
APPLICATION NO. : 11/356816
DATED             : September 8, 2009
INVENTOR(S)       : Rudin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 875 days.

Signed and Sealed this

Twenty-first Day of September, 2010

David J. Kappos
*Director of the United States Patent and Trademark Office*